US012640276B1

(12) United States Patent
Gaspar et al.

(10) Patent No.: US 12,640,276 B1
(45) Date of Patent: May 26, 2026

(54) NUCLEAR REACTOR SYSTEM ARRANGED TO INJECT MATERIAL INTO HEAT PIPES TO SUPPRESS A FIRE

(71) Applicant: Triad National Security, LLC, Los Alamos, NM (US)

(72) Inventors: Lindsey Michal Gaspar, Los Alamos, NM (US); Robert Stowers Reid, Los Alamos, NM (US)

(73) Assignee: TRIAD NATIONAL SECURITY, LLC, Los Alamos, NM (US)

(*) Notice: Subject to any disclaimer, the term of this patent is extended or adjusted under 35 U.S.C. 154(b) by 512 days.

(21) Appl. No.: 18/166,835

(22) Filed: Feb. 9, 2023

Related U.S. Application Data

(60) Provisional application No. 63/308,724, filed on Feb. 10, 2022.

(51) Int. Cl.
*G21C 9/04* (2006.01)
*G21C 15/257* (2006.01)

(52) U.S. Cl.
CPC ............. *G21C 9/04* (2013.01); *G21C 15/257* (2013.01)

(58) Field of Classification Search
CPC .......... G21C 9/04; G21C 15/257; G21C 7/00; G21C 7/22; G21C 7/32; G21C 9/00; F17D 1/12; F17D 5/00; G21F 1/00; A62C 3/00; A62C 5/00; G01K 3/00; G01K 3/005;

(Continued)

(56) References Cited

U.S. PATENT DOCUMENTS

| | | | | |
|---|---|---|---|---|
| 3,207,672 A * | 9/1965 | Didier | C02F 3/28 | 376/338 |
| 6,768,781 B1 * | 7/2004 | Moriarty | G21C 15/257 | 376/907 |
| 10,731,783 B2 * | 8/2020 | Gelin | F16L 37/36 | |

(Continued)

FOREIGN PATENT DOCUMENTS

WO WO-2019200468 A1 * 10/2019 ............... G21C 7/22

OTHER PUBLICATIONS

Manoj, Performance Evaluation of Sodium Heat Pipes, Frontiers in Heat Pipes 2012 (Year: 2012).*

(Continued)

*Primary Examiner* — Jack W Keith
*Assistant Examiner* — Daniel Wasil
(74) *Attorney, Agent, or Firm* — ALSTON & BIRD LLP

(57) ABSTRACT

A system for mitigating and/or preventing potential fire hazards in a nuclear reactor including a heat pipe reactor core is provided. The system further comprises a plurality of heat pipes, the heat pipe reactor core engaging the plurality of heat pipes between first and second ends of each respective heat pipe. A heat exchanger device defining an enclosed gas chamber annularly surrounds at least a portion of at least one heat pipe. The system further comprises a first valve and a second valve positioned proximate the first end of the at least one heat pipe, the first valve fluidly coupling the at least one heat pipe to a first suppressant chamber and the second valve fluidly coupling the enclosed gas chamber to a second suppressant chamber. Each of the first and second valves is movable between open and closed positions to regulate the flow of fire suppressant material from the first and second suppressant chambers, respectively.

20 Claims, 7 Drawing Sheets

(58) Field of Classification Search
CPC .. H05K 7/20336; F02M 31/005; F28D 15/02; F28D 15/0283
USPC .......................................................... 376/279
See application file for complete search history.

(56) References Cited

U.S. PATENT DOCUMENTS

| | | | | |
|---|---|---|---|---|
| 11,238,997 | B2 * | 2/2022 | Petrosky | G21C 17/112 |
| 2014/0099782 | A1 * | 4/2014 | Bassom | F28D 15/04<br>257/E21.334 |
| 2017/0106220 | A1 * | 4/2017 | Loewen | G21C 9/04 |
| 2018/0268950 | A1 * | 9/2018 | Mckellar | G21D 1/006 |

OTHER PUBLICATIONS

Yan, Technology of micro heat pipe cooled reactor, Science Direct, 135, 2020 (Year: 2020).*
U.S. Dept. of Transportation, Federal Aviation Administration, Eval of Fire-Extinguishing Agent for Combustible Metal Fires (Year: 2006).*
Annals of Nuclear Energy; Technology of micro heat pipe cooled reactor, Yan, 2019 (Year: 2019).*
Frontiers in Heat Pipes; Performance Eval of Sodium Heat Pipes, Manoj (Year: 2012).*

* cited by examiner

NUCLEAR REACTOR SYSTEM ARRANGED TO INJECT MATERIAL INTO HEAT PIPES TO SUPPRESS A FIRE

CROSS-REFERENCE TO RELATED APPLICATIONS

This application claims priority to and the benefit of U.S. Provisional Application No. 63/308,724, filed on Feb. 10, 2022, the content of which is incorporated by reference herein in its entirety.

STATEMENT OF FEDERAL RIGHTS

This invention was made with government support under 89233218CNA000001 awarded by the National Nuclear Security Administration. The government has certain rights in the invention.

TECHNOLOGICAL FIELD

Example embodiments of the present disclosure relate generally to heat pipes and heat pipe-cooled reactors and, more particularly, to regulating temperature and/or pressure and mitigating and/or preventing potential fire hazards associated heat pipe-cooled reactor systems.

BACKGROUND

Heat pipe-cooled reactors utilize a plurality of heat pipes, each of which operates as a redundant heat transfer device to dissipate and/or transfer thermal energy away from the reactor core. Alkali metal heat pipe-cooled reactors, which include heat pipes utilizing an alkali metal working fluid, are being proposed for remote power generation. While heat pipe-cooled reactors are typically regarded as safe and reliable, the inventors have identified a number of deficiencies and problems in alkali metal heat pipe-cooled reactor systems. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, example embodiments of the present disclosure provided herein may provide solutions to the problems and needs in the art that have not yet been fully identified, appreciated, or solved by current heat pipe-cooled reactor technology. In accordance with one exemplary embodiment of the present disclosure, a system comprises a nuclear reactor, a plurality of heat pipes coupled to the nuclear reactor, and a valve fluidly coupled to at least one heat pipe of the plurality of heat pipes, wherein the valve is configured to regulate a flow of fire suppressant material from a suppressant chamber into the at least one heat pipe.

In some embodiments, the nuclear reactor comprises a heat pipe reactor core, the at least one heat pipe of the plurality of heat pipes comprises an elongated body defining a first end of the at least one heat pipe and a second end opposite the first end, and the first end and the second end of the at least one heat pipe are positioned externally of the heat pipe reactor core such that the heat pipe reactor core engages the at least one heat pipe between the first end and the second end of the at least one heat pipe. In certain embodiments, the fire suppressant material comprises boron.

In some embodiments, the nuclear reactor comprises one or more auxiliary devices and the at least one heat pipe is configured to assist in regulating a temperature of at least one auxiliary device.

In some embodiments, the system further comprises at least one sensor, and a controller communicably coupled with the at least one sensor, the controller configured to receive sensed temperature data from the at least one sensor, the sensed temperature data indicative of a temperature of at least a portion of the system, determine whether the sensed temperature satisfies a predefined threshold, and in response to determining that the sensed temperature data satisfies the predefined threshold, activate the valve such that a flow of fire suppressant material is injected into an interior cavity of the at least one heat pipe. In certain embodiments, the nuclear reactor comprises a heat pipe reactor core and the at least one sensor is located proximate the heat pipe reactor core. In other embodiments, the at least one heat pipe of the plurality of heat pipes comprises an elongated body defining a first end of the at least one heat pipe and a second end opposite the first end and wherein the system further comprises a second valve fluidly coupled to the at least one heat pipe of the plurality of heat pipes, wherein the second valve is configured to regulate a flow of fire suppressant material from a second suppressant chamber into the at least one heat pipe, wherein the valve is fluidly coupled to the first end of the at least one heat pipe and the second valve is fluidly coupled to the second end of the at least one heat pipe. In some embodiments the controller is further configured to determine whether the sensed temperature satisfies a second predefined threshold, and in response to determining that the sensed temperature data satisfies the second predefined threshold, activate the valve and the second valve such that flows of fire suppressant material are injected into the interior cavity of the at least one heat pipe via the first and second ends of the at least one heat pipe.

In other embodiments, the second valve is further configured to regulate a flow of a working fluid from the second end of the at least one heat pipe and wherein the controller is further configured to determine whether the sensed temperature satisfies a second predefined threshold, and in response to determining that the sensed temperature data satisfies the second predefined threshold, activate the second valve to evacuate at least a portion of a working fluid from the at least one heat pipe through the second valve. In certain embodiments, the evacuation of the at least a portion of the working fluid through the second valve is configured to occur simultaneously with the injection of the fire suppressant material into the interior cavity of the at least one heat pipe via the first valve. In certain other embodiments, the injection of the fire suppressant material into the interior cavity of the at least one heat pipe via the first valve is configured to occur subsequent to the evacuation of the at least a portion of the working fluid through the second valve.

In some embodiments, a heat exchanger device is disposed proximate a first end of the at least one heat pipe, the heat exchanger device defining an enclosed gas chamber annularly surrounding at least a portion of the at least one heat pipe, and wherein the enclosed gas chamber comprises an inert gas. In certain embodiments, the system further includes a third valve fluidly coupled to the enclosed gas chamber, wherein the third valve is configured to regulate a flow of fire suppressant material from a third suppressant chamber into the enclosed gas chamber. In certain other embodiments, the heat exchanger device comprises a layer of phase change material disposed on an outer surface of the enclosed gas chamber. In certain further embodiments, the phase change material is a salt. In still further embodiments, the phase change material is a Class D fire extinguishing material.

In certain embodiments, the layer of phase change material is partitioned by one or more partition components, the one or more partition components extending from the outer surface of the enclosed gas chamber, through the layer of phase change material, to an outer surface of the layer of phase change material. In certain further embodiments, the heat exchanger device comprises at least one heat dissipating surface disposed on the outer surface of the layer of phase change material, the at least one heat dissipating surface comprising one or more fin components.

In some embodiments, the nuclear reactor comprises a heat pipe reactor core, wherein the heat pipe reactor core further comprises a plurality of gaps between a plurality of fuel rods and the plurality of heat pipes, and wherein a neutron absorber material is disposed in the plurality of gaps. In certain embodiments, the system is configured to disperse the neutron absorber material in response to a presence of an alkali metal fire in order to aid in a shutdown of the heat pipe reactor core.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below. Indeed, although described herein with reference to a heat-pipe cooled reactor core, the present disclosure contemplates that, in some embodiments, the heat pipe(s) may instead or also be used to cool and/or extinguish fires in other components or auxiliary equipment in other locations of a nuclear reactor and is not limited to a heat-pipe cooled reactor core. In such an embodiment, the heat pipe(s) may interface with an auxiliary device, such as an auxiliary pump in a molten salt-cooled reactor core. For example, an auxiliary pump may be used to pump molten salt through a molten-salt cooled reactor core (e.g., in which heat pipes may or may not be utilized in the reactor core) and the auxiliary pump itself may be cooled by at least one heat pipe as described herein. Said differently, the heat pipe embodiments described herein may be applicable for use with auxiliary equipment in nuclear reactors that include a heat-pipe cooled reactor core as well as nuclear reactors that do not include a heat-pipe cooled reactor core.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
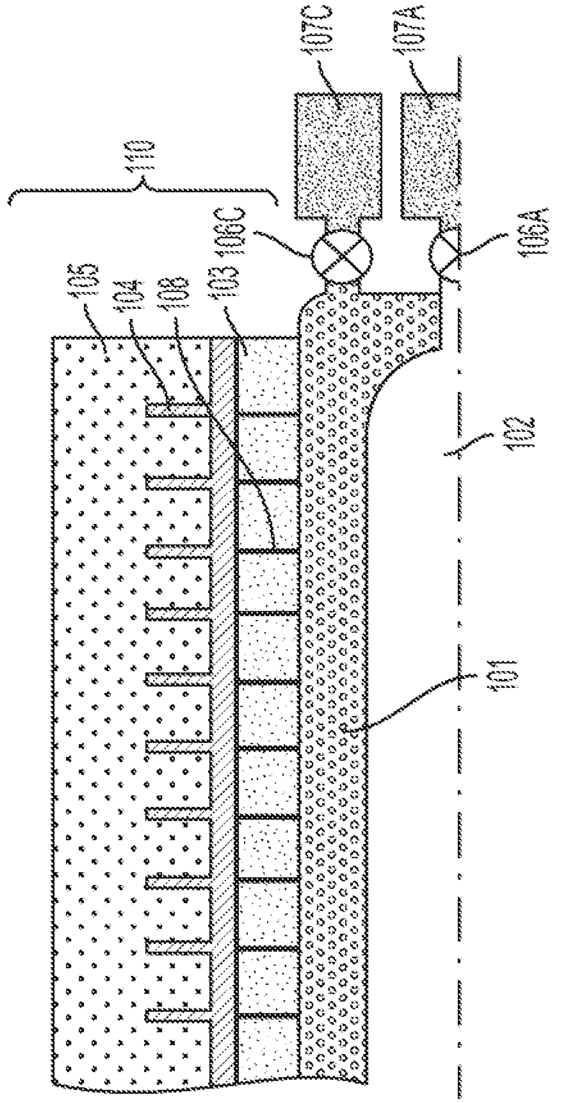
FIG. 1A illustrates a first end of an example heat pipe structured in accordance with some example embodiments described herein.

Some embodiments of the present disclosure will now be described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a heat pipe, a heat pipe reactor core, a heat pipe-cooled reactor, and/or a controller as an example "apparatus." However, elements of the apparatus described herein may be equally applicable to a system, method, or computer program product. Thus, use of any such terms should not be taken to limit the spirit and scope of embodiments of the present invention.

Example System for Implementing Embodiments of the Present Disclosure

In some embodiments of the present disclosure, a system comprises a nuclear reactor and a plurality of heat pipes coupled to the nuclear reactor. In certain embodiments, the nuclear reactor comprises a heat pipe reactor core and the plurality of heat pipes are at least partially disposed within the heat pipe reactor core, such that the nuclear reactor is a heat pipe-cooled reactor. A heat pipe comprises an elongated body defining a first end and a second end opposite the first end. In certain embodiments, the plurality of heat pipes extend from or otherwise project outwardly from at least a first side of the heat pipe reactor core in a heat pipe-cooled reactor. Said differently, at least the first end of the heat pipe is positioned externally of the heat pipe reactor core. In embodiments wherein the first end of the heat pipe extends from nuclear reactor core and the second end is embedded within the nuclear reactor core, such heat pipes may be referred to as single-ended heat pipes.

In other embodiments, the plurality of heat pipes extend from or otherwise project outwardly from both sides of the heat pipe reactor core in a heat pipe-cooled reactor, such that the heat pipe reactor core engages or is otherwise positioned between opposite ends of the plurality of heat pipes. Said differently, both the first and second ends of the heat pipe are positioned externally of the heat pipe reactor core and the heat pipe reactor core engages the heat pipe somewhere between the first end and the second end. In such embodiments wherein both the first and second ends of the heat pipe extend from nuclear reactor core, such heat pipes may be referred to as dual-ended heat pipes.

During operation of such heat pipe-cooled reactors, each of the plurality of heat pipes operates as a redundant heat transfer device to dissipate and/or transfer thermal energy away from the heat pipe reactor core. In some embodiments, the plurality of heat pipes transfer such thermal energy (e.g., heat) from the heat pipe reactor core outward to one or more heat exchanger devices in communication with the end(s) of the heat pipes. In certain embodiments, a continuous evaporation and condensation cycle of a working fluid within the heat pipe may be used to transfer such thermal energy away from the heat pipe reactor core.

In some embodiments, the heat pipes may be alkali metal heat pipes such that they are at least partially filled with a working fluid comprising an alkali metal, such as potassium, sodium, or lithium. Such heat pipes may pose safety hazards, such as potential fire hazards attributable to the use of such alkali metals. For example, a breach in a heat pipe-cooled reactor may expose the working fluid within a heat pipe to a water-based cooling fluid or to the external environment, causing an alkali metal fire to spontaneously ignite if safety features are not implemented.

Figure 1B:
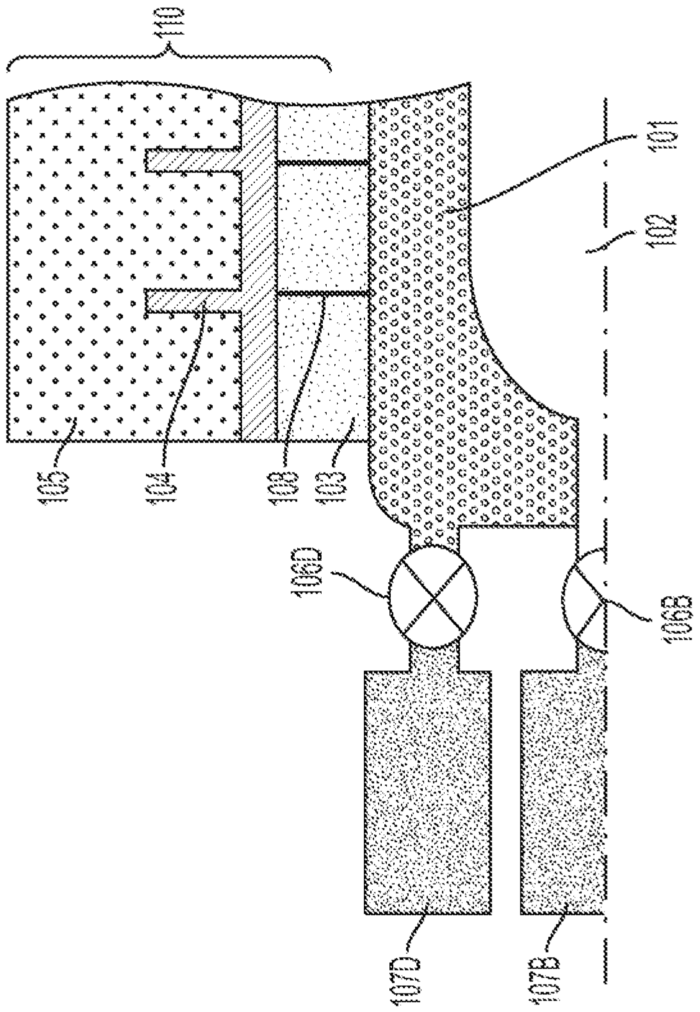
FIG. 1B illustrates a second end of an example heat pipe structured in accordance with some example embodiments described herein.
Figure 1C:
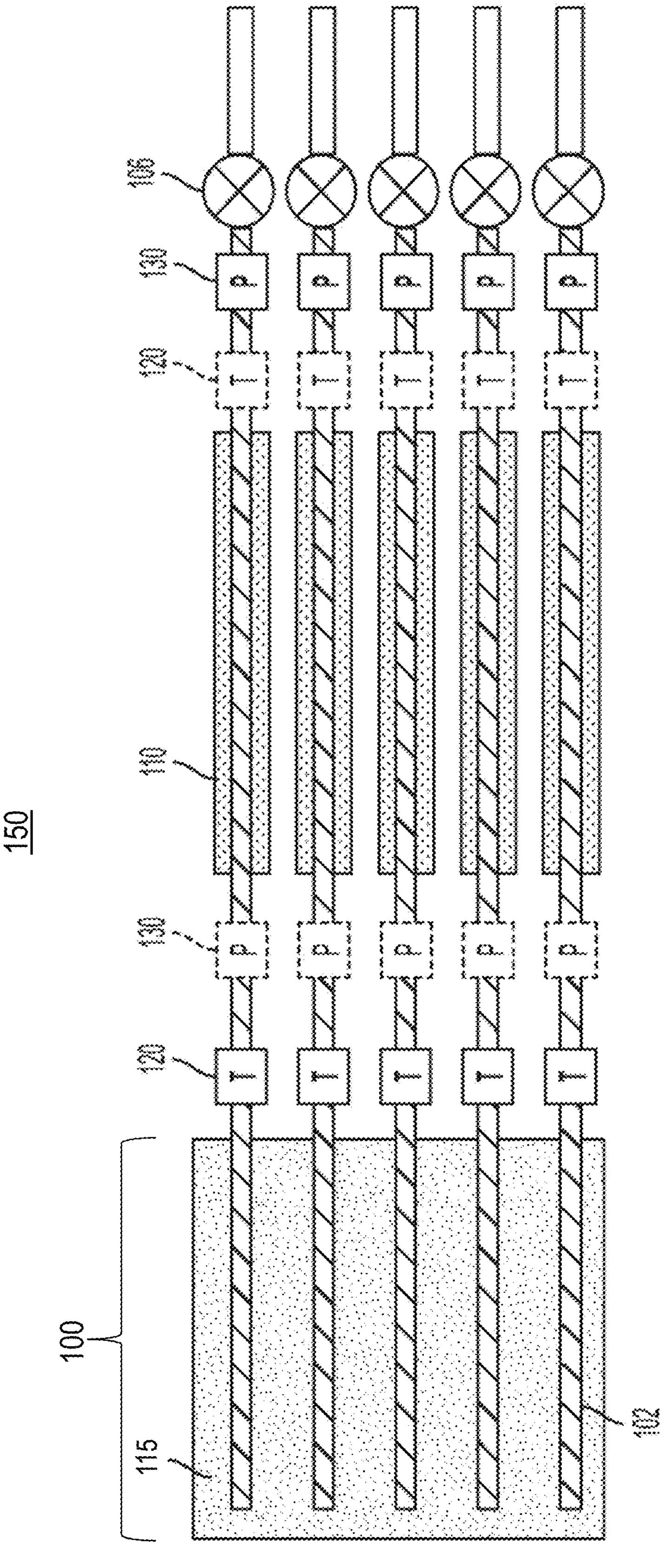
FIG. 1C illustrates an example nuclear reactor and FIG. 1D illustrates an example heat pipe reactor core in accordance with some example embodiments described herein.

With reference to FIG. 1A, an example heat pipe 102 is illustrated for implementing one or more of the fire mitigation and/or spread prevention techniques described herein. In some embodiments, a valve 106 (e.g., first valve 106A) is fluidly coupled to the heat pipe 102. In In certain embodiments, the heat pipe 102 is in fluid communication with a suppressant chamber 107 (e.g., a first suppressant chamber 107A) and the valve 106A is configured to regulate a flow of fire suppressant material from the suppressant chamber 107 (e.g., first suppressant chamber 107A) into the heat pipe 102. The valve 106A may be configured to regulate the flow of the fire suppressant material from the first suppressant chamber 107A into the first end of the heat pipe 102. For example, during normal operation (e.g., no fire detected) of a heat pipe-cooled reactor, the valve(s) 106 between the heat pipe 102 and the suppressant chamber(s) 107 is closed, preventing the fire suppressant material from entering the heat pipe 102. In some embodiments, the heat pipe-cooled reactor further comprises at least one sensor (shown in FIG. 1C) and/or a controller (shown in FIG. 3), and when a fire or fire-like conditions are sensed and/or detected in the heat pipe-cooled reactor via the at least one sensor and/or controller as described hereafter with respect to FIGS. 3-4, the valve 106 (e.g., first valve 106A) is activated (e.g., allowing a flow path between the first suppressant chamber 107A and the heat pipe 102 to be opened) such that a flow of fire suppressant material is injected into an interior cavity of the heat pipe 102 (e.g., via the first end of the heat pipe 102 connected to or otherwise in communication with the first valve 106A). For example, in some embodiments, as depicted in FIG. 1C, at least one sensor is a temperature sensor (shown as 120 in FIG. 1C) located proximate the heat pipe reactor core (shown as 100 in FIG. 1C). In certain embodiments, the temperature sensor is located proximate a valve 106. However, any suitable location, type of sensors, and/or number of sensors, may be used without deviating from the scope of the invention. For example, in a non-limiting embodiment, at least one sensor is a pressure sensor (shown as 130 in FIG. 1C) located proximate at least one of the valve(s) 106 as depicted in FIG. 1C.

In some embodiments, the fire suppressant material in the suppressant chamber(s) 107 comprises boron and/or a salt. For example, in a non-limiting exemplary embodiment wherein the nuclear reactor comprises a heat pipe-cooled reactor core, the fire suppressant material is boric oxide (boron trioxide), boron trifluoride, and/or boron trichloride. In some embodiments, the fire suppressant material used for auxiliary equipment may not contain boron.

Figure 1D:
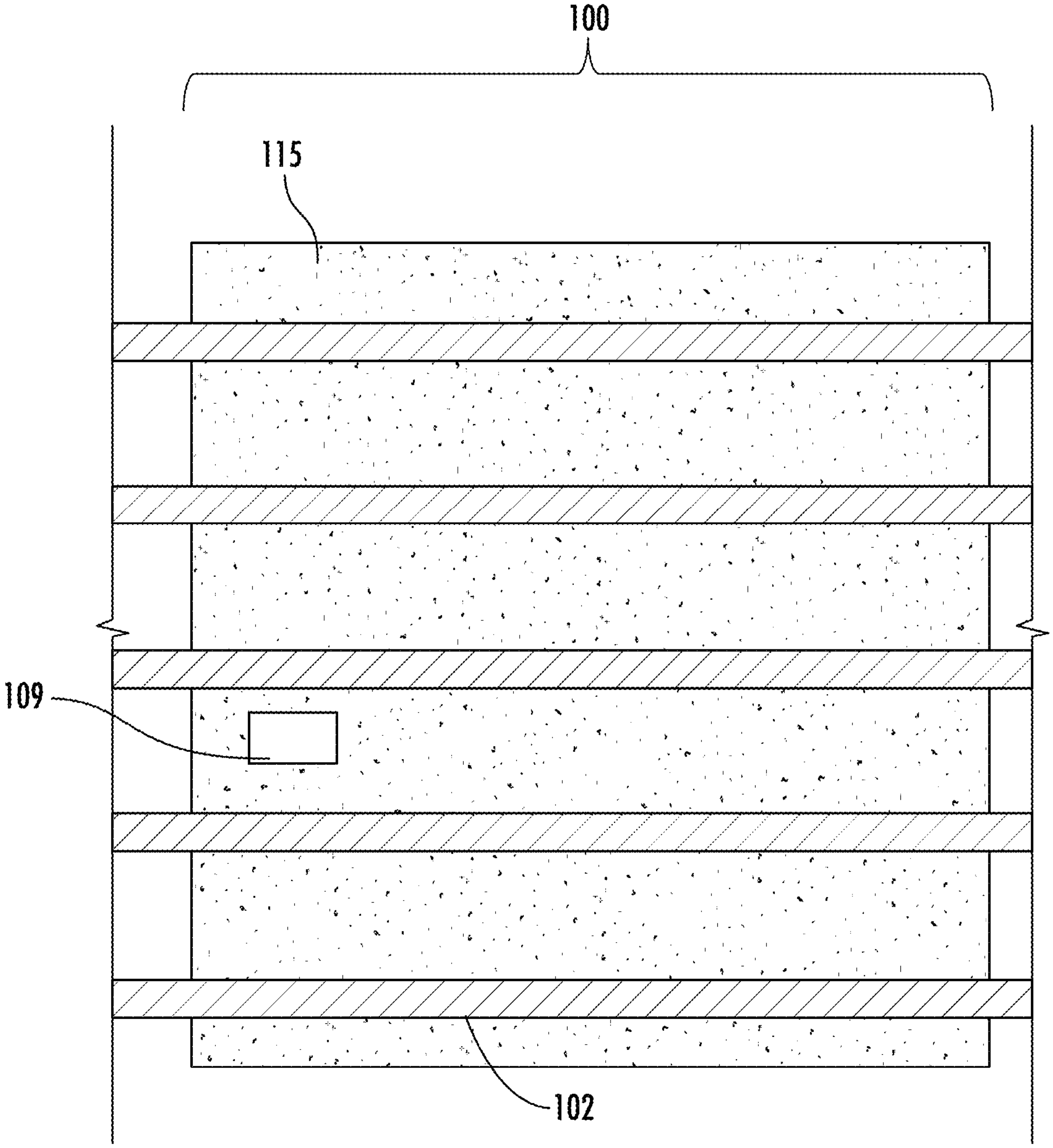

The present disclosure is not limited to heat pipe-cooled reactor cores and contemplates the use of such augmented heat pipes for fire mitigation technology and/or spread prevention measures in other locations of a nuclear reactor system. For example, in some embodiments, the system comprises a nuclear reactor and a plurality of heat pipes coupled to the nuclear reactor. In certain embodiments, the nuclear reactor comprises one or more auxiliary devices and at least one heat pipe of the plurality of heat pipes is configured to assist in regulating a temperature of at least one auxiliary device (e.g., an auxiliary pump 109). In still further embodiments, the at least one heat pipe of the plurality of heat pipes is configured to assist in regulating a pressure of the nuclear reactor core and/or the at least one auxiliary device (e.g., an auxiliary pump 109 as depicted in FIG. 1D).

In still further embodiments, each end of the heat pipe 102 is in fluid communication with a respective suppressant chamber 107. For example, in some embodiments, such as a dual-ended heat pipe, wherein the heat pipe 102 extends outwardly from both sides of the heat pipe reactor core and the heat pipe reactor core engages with or is otherwise positioned between opposite ends of the heat pipe 102, the heat pipe 102 is in fluid communication with a suppressant chamber 107 (e.g., a first suppressant chamber 107A) and a valve (e.g., first valve) 106A is fluidly coupled to the first end of the heat pipe 102, the valve 106A configured to regulate a flow of fire suppressant material from the suppressant chamber (e.g., the first suppressant chamber) 107A into the heat pipe 102 (e.g., the first end of the heat pipe) as depicted in FIG. 1A and a second valve 106B is fluidly coupled to the second end of the heat pipe 102, the second valve 106B configured to regulate a flow of fire suppressant material from a second suppressant chamber 107B into the heat pipe 102 (e.g., the second end of the heat pipe), as depicted in FIG. 1B. In some embodiments, the valve(s) 106 are activated and/or operated simultaneously or in series as described hereafter with respect to FIGS. 3-4. For example, in a non-limiting exemplary embodiment, the valve 106A and the second valve 106B (as depicted in FIGS. 1A and 1, respectively) are activated simultaneously in order to inject fire suppressant material into both ends of the heat pipe 102 at the same time. In some embodiments, the fire suppressant material in the first suppressant chamber 107A is the same material as the fire suppressant material in the second suppressant chamber 107B. In other embodiments, the fire suppressant material in the first suppressant chamber 107A differs from the fire suppressant material in the second suppressant chamber 107B. FIG. 1D shows heat pipes 102 extending outwardly from both sides of a heat pipe reactor core 100, which includes an interior block 115. That is, the first end and the second end of each respective heat pipe 102 are positioned externally of the heat pipe reactor core 100, such that the heat pipe reactor core 100 engages the plurality of heat pipes between the first end and the second end of the respective heat pipe.

Additionally or alternatively, in some embodiments, the second valve 106B is activated in order to evacuate at least a portion of a working fluid from the heat pipe 102 through the second valve 106B. In certain embodiments, such evacuation of the working fluid through the second end of the heat pipe 102 is configured to occur prior to the injection of the fire suppressant material into the first end of the heat pipe 102 to encourage sufficient dispersion of the fire suppressant material throughout the heat pipe 102. In still other embodiments, such evacuation of the working fluid through the second end of the heat pipe 102 is configured to occur simultaneously with the injection of the fire suppressant material into the first end of the heat pipe 102.

With further reference to FIG. 1A, a heat exchanger device 110 is disposed proximate the first end of the heat pipe 102. In some embodiments, the heat exchanger device 110 defines an enclosed gas chamber 101 annularly surrounding at least a portion of the heat pipe 102, wherein the enclosed gas chamber 101 comprises an inert gas. Said differently, an inert gas gap is incorporated between an outer surface of the end of the heat pipe 102 and the heat exchanger device 110. In some embodiments, the enclosed gas chamber 101 creates a gap or additional spacing between the outer surface of the heat pipe 102 and, for example, a cooling fluid 105 used in the heat exchanger device 110. Such gapping may mitigate possible interaction between the cooling fluid 105 (e.g., water) and a reactive working fluid (e.g., sodium) in the heat pipe 102. For example, in a non-limiting exemplary embodiment, the enclosed gas chamber 101 (e.g., inert gas gap) introduces an additional point of failure before incompatible fluids (e.g., water-based cooling fluid and alkali metal-based working fluid) may come into contact (e.g., during a breach of the heat pipe 102), thereby serving as an additional fire mitigation and/or prevention measure. In still further embodiments, the inert gas within the enclosed gas chamber 101 may be used as a blanketing agent for suppressing existing flames in the event of an actual fire in the heat pipe-cooled reactor.

Additionally or alternatively, in some embodiments, the enclosed gas chamber 101 is in fluid communication with a third suppressant chamber 107C via a third valve 106C. That is, in certain embodiments, a third valve 106C is fluidly coupled to the enclosed gas chamber 101, the third valve 106C configured to regulate a flow of fire suppressant material from the third suppressant chamber 107C into the enclosed gas chamber 101. For example, during normal operation (e.g., no fire detected) of a heat pipe-cooled reactor, the third valve 106C between the enclosed gas chamber 101 and the third suppressant chamber 107C is closed, preventing the fire suppressant material from entering the enclosed gas chamber 101. In some embodiments, when a fire or fire-like conditions are detected in the heat pipe-cooled reactor as described hereafter with respect to FIGS. 3-4, the third valve 106C is activated (e.g., allowing a flow path between the third suppressant chamber 107C and the enclosed gas chamber 101 to be opened) such that a flow of fire suppressant material is injected into the enclosed gas chamber 101.

Additionally or alternatively, in some embodiments, the enclosed gas chamber 101 is in fluid communication with a fourth suppressant chamber 107D via a fourth valve 106D. That is, in certain embodiments, a fourth valve 106D is fluidly coupled to the enclosed gas chamber 101, the fourth valve 106D configured to regulate a flow of fire suppressant material from the fourth suppressant chamber 107D into the enclosed gas chamber 101. For example, during normal operation (e.g., no fire detected) of a heat pipe-cooled reactor, the fourth valve 106D between the enclosed gas chamber 101 and the fourth suppressant chamber 107D is closed, preventing the fire suppressant material from entering the enclosed gas chamber 101. In some embodiments, when a fire or fire-like conditions are detected in the heat pipe-cooled reactor as described hereafter with respect to FIGS. 3-4, the fourth valve 106D is activated (e.g., allowing a flow path between the fourth suppressant chamber 107D and the enclosed gas chamber 101 to be opened) such that a flow of fire suppressant material is injected into the enclosed gas chamber 101.

In some embodiments, such injection of fire suppressant material from the third suppressant chamber 107C and/or the fourth suppressant chamber 107D into the enclosed gas chamber 101 occurs prior to injection of fire suppressant material into the heat pipe 102. In other embodiments, such injection of fire suppressant material into the enclosed gas chamber 101 occurs subsequent to injection of fire suppressant material into the heat pipe 102. In still other embodiments, such injection of fire suppressant material into the enclosed gas chamber 101 occurs simultaneously with injection of fire suppressant material into the heat pipe 102.

Figure 3:
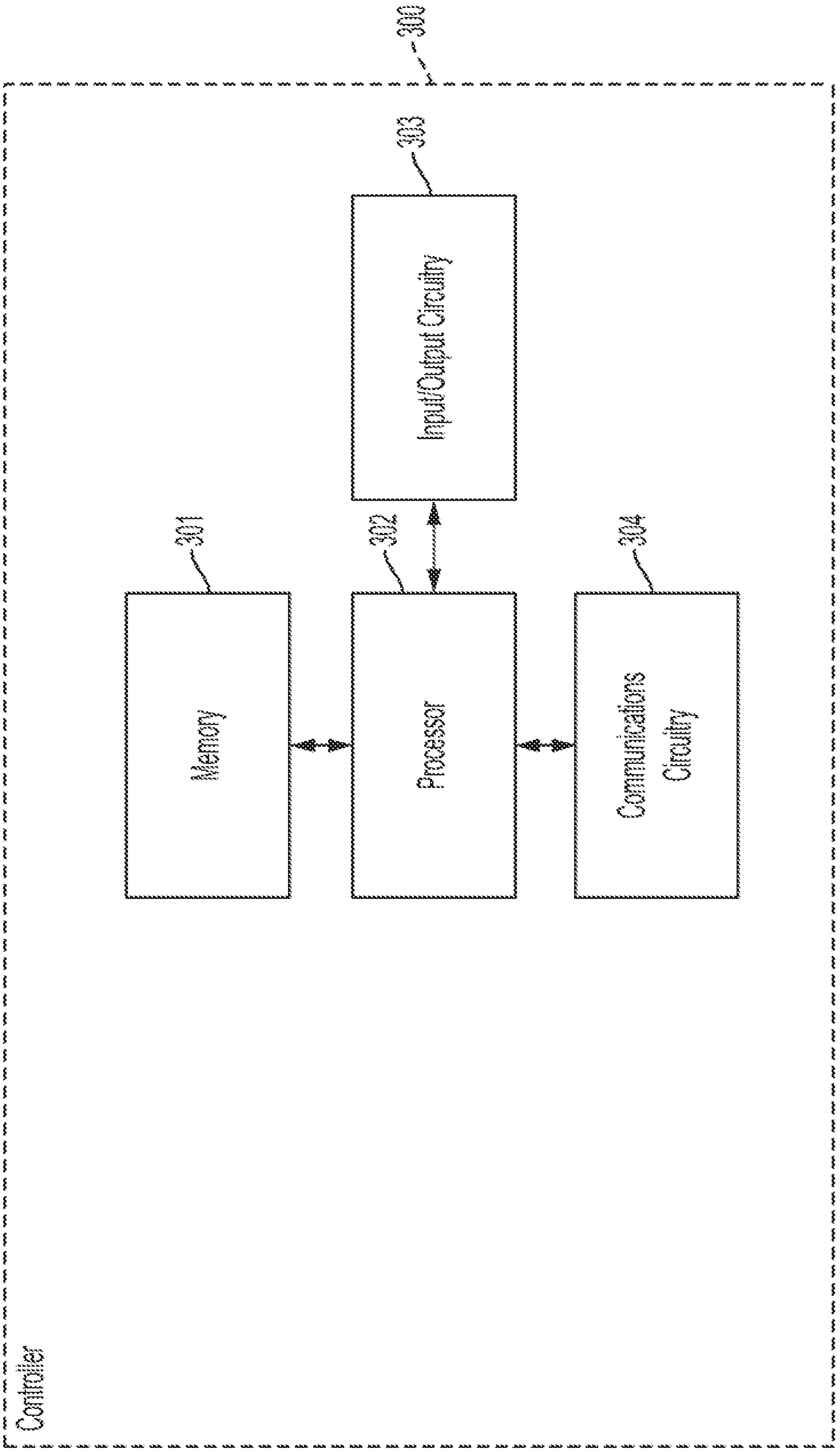
FIG. 3 illustrates a schematic block diagram of example circuitry that may perform various operations, in accordance with some example embodiments described herein.
Figure 4:
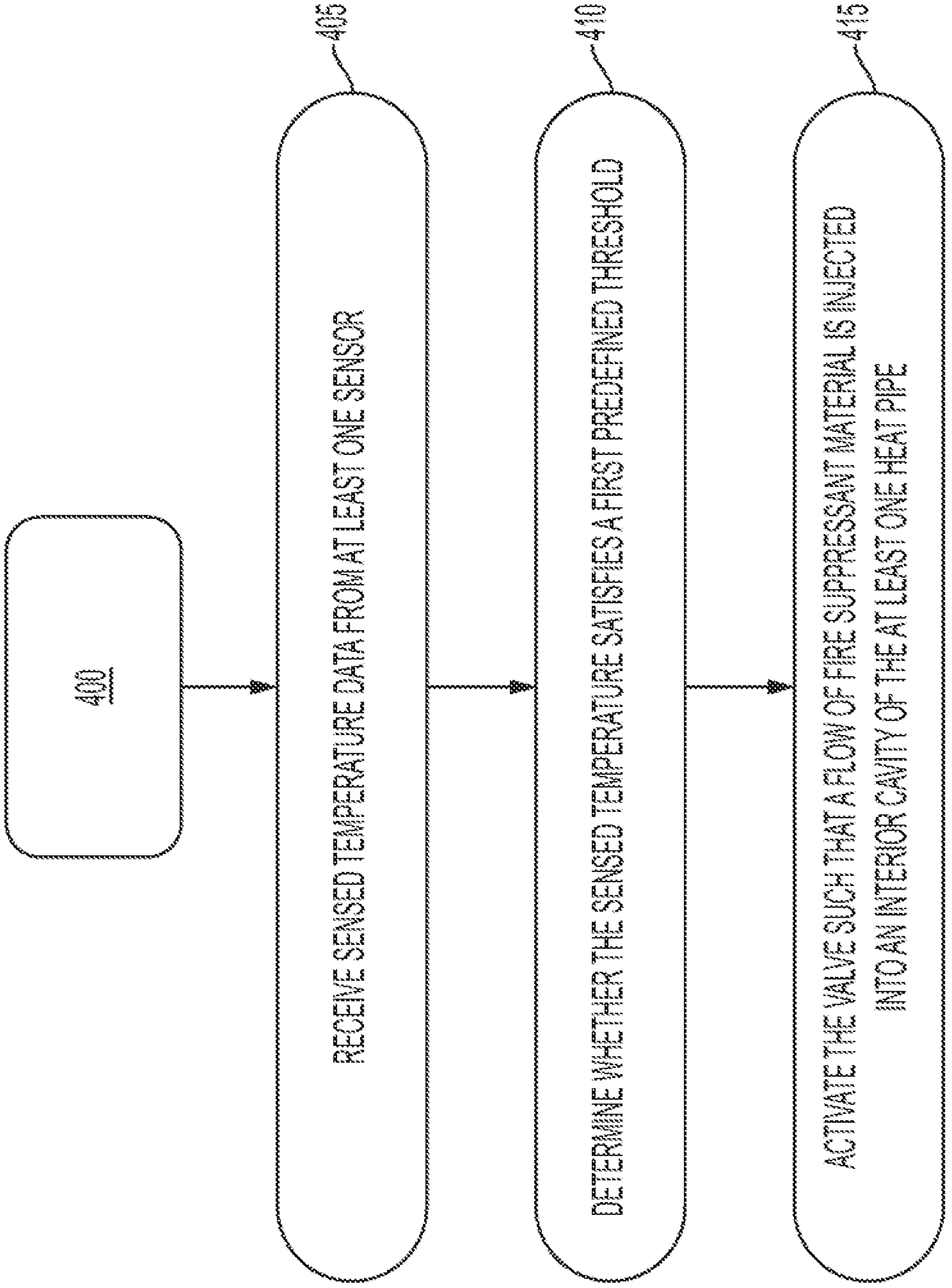
FIG. 4 illustrates an example flowchart for activating one or more valves, in accordance with some example embodiments described herein.

In some embodiments, the valves 106C, 106D fluidly coupled to the enclosed gas chamber 101 are activated and/or operated simultaneously or in series as described hereafter with respect to FIGS. 3-4. For example, in a non-limiting exemplary embodiment, the third valve 106C and the fourth valve 106D (as depicted in FIGS. 1A and 1, respectively) are activated simultaneously in order to inject fire suppressant material into both ends of the enclosed gas chamber 101 at the same time. In some embodiments, the fire suppressant material in the third suppressant chamber 107C is the same material as the fire suppressant material in the fourth suppressant chamber 107D. In other embodiments, the fire suppressant material in the third suppressant chamber 107C differs from the fire suppressant material in the fourth suppressant chamber 107D.

Additionally or alternatively, in some embodiments, the fourth valve 106D is activated in order to evacuate at least a portion of the inert gas of the enclosed gas chamber 101 through the fourth valve 106D. In certain embodiments, such evacuation of the inert gas through the fourth valve 106D is configured to occur prior to the injection of the fire suppressant material via the third valve 106C encourage sufficient dispersion of the fire suppressant material throughout the enclosed gas chamber 101. In still other embodiments, such evacuation of the inert gas through the fourth valve 106D is configured to occur simultaneously with the injection of the fire suppressant material through the third valve 106C.

Similar to the heat pipe 102, in some embodiments, the fire suppressant material in the third suppressant chamber 107C and/or fourth suppressant chamber 107D comprises boron and/or a salt. For example, in a non-limiting exemplary embodiment, the fire suppressant material is boric oxide (boron trioxide), boron trifluoride, and/or boron trichloride. In some embodiments, the fire suppressant material in the third and/or fourth suppressant chambers 107C, 107D differs from the fire suppressant material in the first and/or second suppressant chambers 107A, 107B. In other embodiments, the fire suppressant material in the third and fourth suppressant chambers 107C, 107D are the same fire suppressant material contained in the first and second suppressant chambers 107A, 107B.

With further reference to FIG. 1A, in some embodiments, the heat exchanger device 110 comprises a layer of phase change material (PCM) 103 disposed on an outer surface of the enclosed gas chamber 101. In such embodiments, the PCM 103 can be used for thermal energy storage from which such collected thermal energy may be dispersed as desired by the heat exchanger device 110 via one or more heat exchanger mechanisms. In some embodiments, the PCM 103 is a Class D fire extinguisher material and/or a salt. In some embodiments, such Class D fire extinguisher materials and/or a salts enable the PCM 103 to serve as an alkali metal fire retardant. In still further embodiments, the PCM 103 may help mitigate the spread of flames should an alkali metal fire occur. Additionally or alternatively, in some embodiments without an enclosed gas chamber 101, the layer of phase change material 103 is disposed on an outer surface of the heat pipe 102.

In certain embodiments, the layer of PCM 103 is partitioned by one or more partition components 108, the one or more partition components 108 extending from the outer surface of the enclosed gas chamber 101 (or the heat pipe 102 in embodiments without an enclosed gas chamber 101), through the layer of PCM 103, to at least an outer surface of the layer of PCM 103. In some embodiments, the one or more partition components 108 include or are attached to one or more fin components 104 which extend outwardly from the outer surface of layer of PCM 103. Such one or more fin components 104 may be added to the partition components 108 and/or the outer surface of the PCM 103 to improve a rate of thermal energy transfer of heat to a cooling fluid 105 and/or surrounding environment. In a non-limiting exemplary embodiment, such one or more fin components 104 may be of a variety of structural formations, such as plates, annular, spiral, and the like. Additionally or alternatively, in some embodiments, the outer surface of the layer of PCM 103 includes one or more additional surface enhancements, such as grooves and/or ribs, to assist in the transfer rate of thermal energy.

With reference to FIG. 1C, an exemplary nuclear reactor 150 structured in accordance with some example embodiments described herein is illustrated. The nuclear reactor 150 comprises a heat pipe reactor core 100 and a plurality of heat pipes 102. Each of the plurality of heat pipes 102 are at least partially disposed within the heat pipe reactor core 100, such that the nuclear reactor 150 is a heat pipe-cooled reactor. A heat pipe 102 comprises an elongated body defining a first end and a second end opposite the first end. In the depicted embodiment, a first end of each heat pipe 102 extends from or otherwise projects outwardly from at least a first side of the heat pipe reactor core 100. That is, the first end of each heat pipe 102 is positioned externally of the heat pipe reactor core 100 and the second end is disposed within the interior block 115 of the heat pipe reactor core 100 such that the heat pipes 102 are depicted as single-ended heat pipes. However, although the nuclear reactor 150 of FIG. 1C is described and depicted herein with reference to single-ended heat pipes, the present disclosure contemplates that, in some embodiments, the heat pipe(s) may instead be dual-ended heat pipes and is not limited to the single-ended heat pipe arrangement depicted.

With further reference to FIG. 1C, a heat exchanger device 110 is disposed proximate the first end of each respective heat pipe 102. The components and potential arrangements of the heat exchanger device(s) 110 may operate as described with reference to FIG. 1A. As depicted in FIG. 1C, a valve 106 is fluidly coupled to each respective heat pipe 102, the valve(s) 106 configured to regulate flow(s) of fire suppressant material from suppressant chamber(s) (shown in FIGS. 1A and 1B) into the respective heat pipe 102.

In some embodiments, the nuclear reactor 150 may include one or more temperature sensors 120 configured to identify a temperature of a portion of the nuclear reactor 150 (e.g., or an auxiliary device in a system). That is, the temperature sensor 120 generates sensed temperature data which is indicative of a temperature of at least a portion of the system. As depicted in FIG. 1C, for example, the nuclear reactor 150 comprises the heat pipe reactor core 100 and a temperature sensor 120 is located proximate the heat pipe reactor core 100 such that the sensed temperature data is indicative of a temperature near and/or in the interior of the heat pipe reactor core 100. Additionally or alternatively, in some embodiments, a temperature sensor 120 is optionally located proximate a valve 106 near an end of the heat pipe 102. The temperature sensor(s) 120 may be communicatively coupled to one or more controllers 300 (shown in FIG. 3).

Additionally or alternatively, in some embodiments, the nuclear reactor 150 may include one or more pressure sensors 130 configured to identify a pressure of a portion of the nuclear reactor 150 (e.g., or an auxiliary device in a system). That is, the pressure sensor 130 generates sensed pressure data which is indicative of a pressure of at least a portion of the system. As depicted in FIG. 1C, for example, a pressure sensor 130 is located proximate a valve 106 near an end of the heat pipe 102, such that the sensed pressure data is indicative of a pressure at and/or near the valve 106. Additionally or alternatively, in some embodiments, a pressure sensor 130 is optionally located proximate the heat pipe reactor core 100. The pressure sensor(s) 130 may be communicatively coupled to one or more controllers 300 (shown in FIG. 3). However, any suitable location, type of sensors, and/or number of sensors, may be used in the system without deviating from the scope of the invention. For example, additionally or alternatively, in some embodiments, at least one sensor (e.g., temperature sensor 120, pressure sensor 130, or the like) may be located proximate an auxiliary device of the nuclear reactor 150, such as a heat pipe-cooled auxiliary pump.

Figure 2:
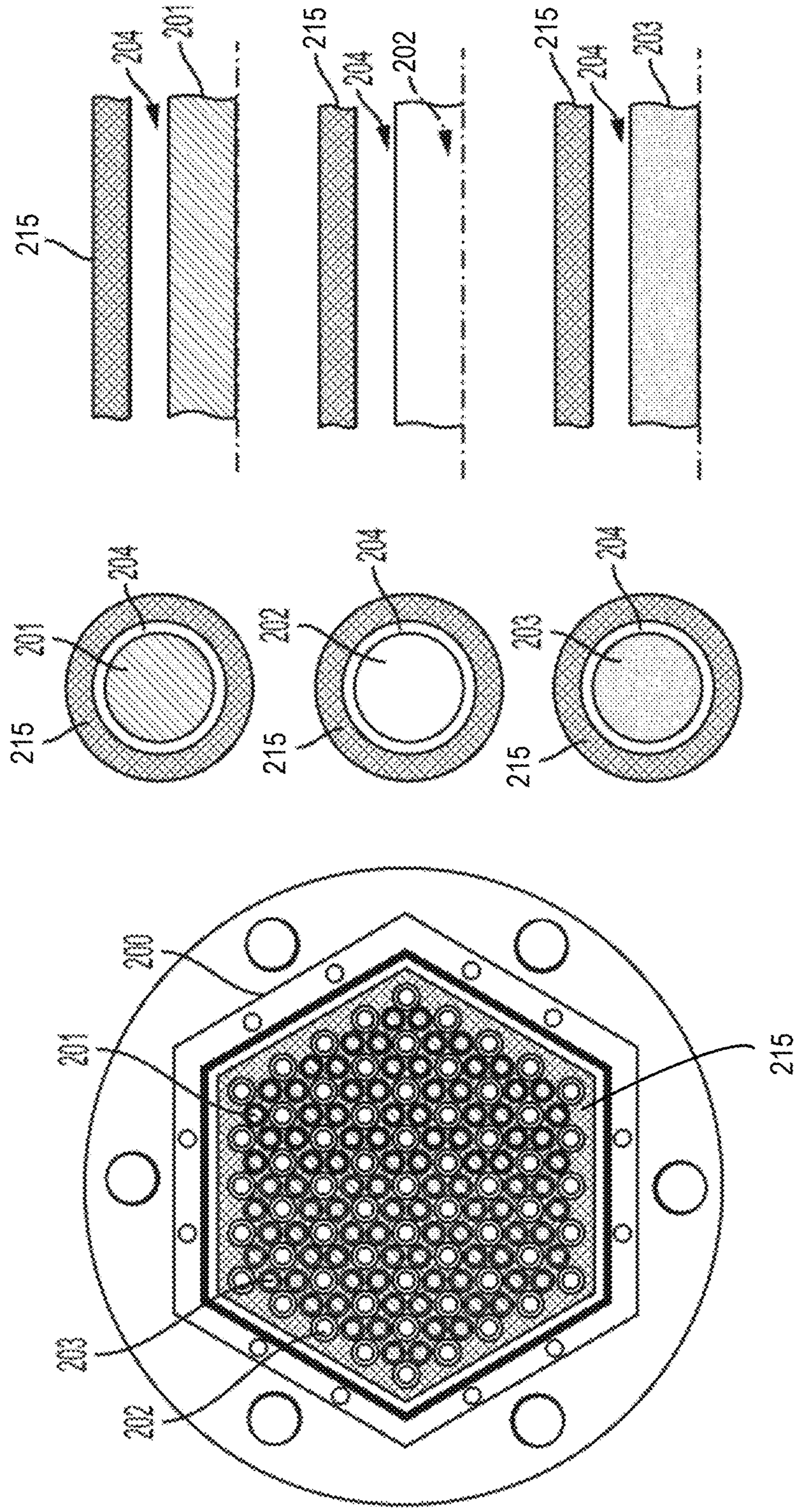
FIG. 2 illustrates an example heat pipe reactor core in accordance with some example embodiments described herein.

With reference to FIG. 2, an exemplary heat pipe reactor core 200 structured in accordance with some example embodiments described herein is illustrated. The heat pipe reactor core 200 comprises a plurality of fuel rods 201, a plurality of heat pipes 202, and moderator material 203. In certain embodiments, each heat pipe 202 thermally engages one or more fuel pins 201 so as to be able to dissipate thermal energy from the interior core block 215 to the heat pipe 202. The arrangement of the fuel rods 201 with respect to the heat pipes 202 is not limited to the arrangement depicted in FIG. 2 and it should be appreciated that many other configurations or arrangements may be employed according to example embodiments. In certain embodiments, moderator material 203 is used to slow neutrons in order to aid in sustaining chain reaction. In some embodiments, the at least one sensor (e.g., temperature sensor 120 as illustrated in FIG. 1C) is located proximate the heat pipe reactor core 200 (e.g., heat pipe reactor core 100 illustrated in FIG. 1C).

In some embodiments, the heat pipes 202 are single-ended heat pipes such that the heat pipe extends from a first side of the heat pipe reactor core 200, a first end of the heat pipe 202 positioned externally of the heat pipe reactor core 200, and the second end disposed within the interior block 215 of the heat pipe reactor core 200 (e.g., see FIGS. 1A and 1C). In still further embodiments, the heat pipes 202 are dual-ended heat pipes such that the heat pipe extends through the interior block 215 of the heat pipe reactor core 200 and outwardly from both a first side and a second side of the heat pipe reactor core 200, such that both the first and second ends of the heat pipe 202 are positioned externally of the heat pipe reactor core 200 (e.g., see FIGS. 1A, 1B, and 1D).

Additionally or alternatively, in some embodiments, such as that represented in FIG. 2, the heat pipe reactor core 200 further comprises a plurality of gaps 204 surrounding the plurality of fuel rods 201, plurality of heat pipes 202, and moderator material 203. In some embodiments, the plurality of gaps 204 may operate as one or more channels in which to disperse a neutron absorber (e.g., neutron poison material) in order to aid in shutdown of the heat pipe-cooled reactor in the presence of an alkali metal fire. For example, in some embodiments, a neutron absorber material is disposed in the plurality of gaps 204 such that when a fire or fire-like conditions is detected, the neutron absorber material is released throughout and surrounding the plurality of fuel rods 201 in order to reduce core reactivity and prevent further damage. In some embodiments, the neutron absorber material comprises boron. For example, in a non-limiting exemplary embodiment, the neutron absorber material is boric oxide (boron trioxide), boron trifluoride, and/or boron trichloride. In other embodiments, the neutron absorber comprises cadmium.

With reference to FIG. 3, a heat pipe-cooled reactor may include circuitry, networked processors, or the like configured to perform some or all of the processes described herein. For example, in some embodiments, the heat pipe-cooled reactor may include a controller configured to receive data from the at least one sensor (e.g., in electrical communication with the at least one sensor). FIG. 3 illustrates a schematic block diagram of example circuitry, some or all of which may be included in an example controller 300 that may be embodied by, at least partially embodied by, or may be commutatively connected to, an apparatus (e.g., a heat pipe-cooled reactor) or any components thereof. However, it should be noted that the components, devices, and elements illustrated in and described with respect to FIG. 3 below may not be mandatory and thus some may be omitted in certain embodiments. Additionally, some embodiments may include further or different components, devices, or elements beyond those illustrated in and described with respect to FIG. 3.

In some embodiments, the controller 300 may be implemented as, or at least partially as, a distributed system or cloud based system and may therefore include any number of remote server devices. Accordingly, example embodiments of the controller 300 may employ remote processing and/or monitoring of data collected by the sensors such that processing of such data may be performed on servers and/or other like computing devices. Regardless of implementation, controller 300 may be configured to control various components of an apparatus (e.g., a heat pipe-cooled reactor) as described herein.

Continuing with FIG. 3, controller 300 may be configured to perform actions in accordance with one or more example embodiments disclosed herein. In this regard, the controller 300 may be configured to perform and/or control performance of one or more functionalities of the heat pipe-cooled reactor and/or components thereof in accordance with various example embodiments. For example, the controller 300 may be in communication with or otherwise control the at least one sensor (e.g., control the at least one sensor to perform a reading) and/or other components of the apparatus. The controller 300 may be further configured to perform data processing, such as processing of data collected by a sensor. In some embodiments, controller 300, or a component(s) thereof, may be embodied as or comprise a circuit chip (e.g., an integrated circuit chip) configured (e.g., with hardware, software, or a combination of hardware and software) to perform operations described herein. The circuit chip may constitute various means, such as memory 301, processor 302, input/output circuitry 303, and/or communications circuitry 304, for performing one or more operations for providing the functionalities described herein. For example, a controller 300 may be configured, using one or more of the circuitry 301, 302, 303, and 304, to execute the operations described below in connection with FIG. 4.

Although the use of the term "circuitry" as used herein with respect to components 301-304 are described in some cases using functional language, it should be understood that the particular implementations necessarily include the use of particular hardware configured to perform the functions associated with the respective circuitry as described herein. It should also be understood that certain of these components 301-304 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the controller 300 may be housed within this device, while other components are housed within another of these devices, or by yet another device not expressly illustrated.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the controller 300 may provide or supplement the functionality of particular circuitry. For example, the processor 302 may provide processing functionality, the memory 301 may provide storage functionality, the communications circuitry 304 may provide network interface functionality, and the like.

In some embodiments, the processor 302 (and/or co-processor or any other processing circuitry assisting or otherwise associated with the processor) may be in communication with the memory 301 via a bus for passing information among components of, for example, controller 300. The memory 301 is non-transitory and may include, for example, one or more volatile and/or non-volatile memories, or some combination thereof. In other words, for example, the memory 301 may be an electronic storage device (e.g., a non-transitory computer readable storage medium). The memory 301 may be configured to store information, data, content, signals, applications, instructions (e.g., computer-executable program code instructions), or the like, for enabling a controller 300 to carry out various functions in accordance with example embodiments of the present disclosure. For example, memory 301 may be configured to store sensor data and/or any other suitable data or data structures. It will be understood that the memory 301 may be configured to store partially or wholly any electronic information, data, data structures, embodiments, examples, figures, processes, operations, techniques, algorithms, instructions, systems, apparatuses, methods, or computer program products described herein, or any combination thereof.

Although illustrated in FIG. 3 as a single memory, memory 301 may comprise a plurality of memory components. The plurality of memory components may be embodied on a single computing device or distributed across a plurality of computing devices. In various embodiments, memory 301 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 301 may be configured to store information, data, applications, instructions, or the like for enabling controller 300 to carry out various functions in accordance with example embodiments discussed herein. For example, in at least some embodiments, memory 301 is configured to buffer data for processing by processor 302. Additionally or alternatively, in at least some embodiments, memory 301 is configured to store program instructions for execution by processor 302. Memory 301 may store information in the form of static and/or dynamic information. This stored information may be stored and/or used by controller 300 during the course of performing its functionalities.

Processor 302 may be embodied in a number of different ways and may, for example, include one or more processing devices configured to perform independently. Additionally, or alternatively, processor 302 may include one or more processors configured in tandem via a bus to enable independent execution of instructions, pipelining, and/or multi-threading. Processor 302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the controller 300, and/or remote or "cloud" processors. Accordingly, although illustrated in FIG. 3 as a single processor, it will be appreciated that in some embodiments, processor 302 comprises a plurality of processors. The plurality of processors may be embodied on a single computing device or may be distributed across a plurality of such devices collectively configured to function as controller 300. The plurality of processors may be in operative communication with each other and may be collectively configured to perform one or more functionalities of controller 300 as described herein. For example, some operations performed herein may be performed by components of the controller 300 while some operations may be performed on a remote device communicatively connected to the controller 300. For example, a user device such as a smart phone, tablet, personal computer and/or the like may be configured to communicate with the controller 300 such as by Bluetooth™ communication or over a local area network. Additionally or alternatively, a remote server device may perform some of the operations described herein, such as processing data collected by any of the sensors, and providing or communicating resultant data to other devices accordingly.

In an example embodiment, processor 302 is configured to execute instructions stored in the memory 301 or otherwise accessible to processor 302. Alternatively, or additionally, the processor 302 may be configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Thus, for example, when the processor 302 is embodied as an ASIC, FPGA, or the like, the processor 302 may be specifically configured hardware for conducting the operations described herein. Alternatively, as another example, when the processor 302 is embodied as an executor of software instructions, the instructions may specifically configure processor 302 to perform one or more algorithms and/or operations described herein when the instructions are executed. For example, these instructions, when executed by processor 302, may cause controller 300 to perform one or more of the functionalities of controller 300 as described herein.

In some embodiments, controller 300 further includes input/output circuitry 303 that may, in turn, be in communication with processor 302 to provide an audible, visual, mechanical, or other output and/or, in some embodiments, to receive an indication of an input from a user or another source. In that sense, input/output circuitry 303 may include means for performing analog-to-digital and/or digital-to-analog data conversions. Input/output circuitry 303 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 303 may comprise a user interface and may comprise a web user interface, a mobile application, a kiosk, or the like. The processor 302 and/or user interface circuitry comprising the processor 302 may be configured to control one or more functions of a display or one or more user interface elements through computer program instructions (e.g., software and/or firmware) stored on a memory accessible to the processor 302 (e.g., memory 301, and/or the like). In some embodiments, aspects of input/output circuitry 303 may be reduced or may even be eliminated from controller 300. Input/output circuitry 303 may be in communication with memory 301, communications circuitry 304, and/or any other component(s), such as via a bus. Although more than one input/output circuitry 303 and/or other component can be included in controller 300, only one is shown in FIG. 3 to avoid overcomplicating the disclosure (e.g., like the other components discussed herein).

Communications circuitry 304, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with controller 300. In this regard, communications circuitry 304 may include, for example, a network interface for enabling communications with a wired or wireless communication network. Accordingly, the communications circuitry 304 may, for example, include supporting hardware and/or software for enabling wireless and/or wireline communications via cable, digital subscriber line (DSL), universal serial bus (USB), Ethernet, or other methods.

In some embodiments, the communications circuitry 304 may include a network configured to transmit information amongst various devices. By way of example, the communications circuitry 304 may be configured to enable communication amongst components of the heat pipe-cooled reactor, the sensor(s), and/or remote computing devices. In some embodiments, communications circuitry 304 is configured to receive and/or transmit any data that may be stored by memory 301 using any protocol that may be used for communications between computing devices. For example, communications circuitry 304 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 304 includes circuitry for interacting with the antenna(s) to cause transmission of signals via the antenna(e) or to handle receipt of signals received via the antenna(e). These signals may be transmitted by controller 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The network in which controller 300 and/or any of the components thereof may operate may include a local area network, the Internet, any other form of a network, or in any combination thereof, including proprietary private and semi-private networks and public networks. The network may comprise a wired network and/or a wireless network (e.g., a cellular network, wireless local area network, wireless wide area network, some combination thereof, and/or the like). Communications circuitry 304 may additionally or alternatively be in communication with the memory 301, input/output circuitry 303 and/or any other component of controller 300, such as via a bus.

As described above and as will be appreciated based on this disclosure, embodiments of the present disclosure may be configured as systems, apparatuses, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations Performed

Having described the apparatus, system, and exemplary circuitry comprising embodiments of the present disclosure, it should be understood that the apparatus may proceed to employ such fire prevention and/or mitigation techniques in a number of ways. FIG. 4 is a flowchart broadly illustrating a series of operations or process blocks that are executed or performed to activate one or more valves in accordance with some example embodiments of the present disclosure. The operations illustrated in FIG. 4 may, for example, be performed by, with the assistance of, and/or under the control of a controller 300, as described above. In this regard, performance of the operations may invoke one or more of memory 301, processor 302, input/output circuitry 303, and/or communications circuitry 304.

As shown in operation 405 in the method 400, the controller 300 receives sensed temperature data from the at least one sensor. For example, the controller 300 may include means, such as the processor 302, input/output circuitry 303, communications circuitry 304, or the like, for receiving sensed temperature data from at least one temperature sensor. In some embodiments, the sensed temperature data is indicative of a temperature of at least a portion of the system (e.g., heat pipe-cooled reactor core 100, 200). For example, in some embodiments in which the nuclear reactor 150 comprises a heat pipe reactor core 100, 200, the at least one sensor is a temperature sensor 120 located proximate the heat pipe reactor core 100, 200 and the sensed temperature data is indicative of a temperature near and/or in the interior of the heat pipe reactor core 100, 200. In other embodiments, the at least one sensor is a temperature sensor 120 located proximate a valve 106 fluidly coupled to the heat pipe and the sensed temperature data is indicative of a temperature near the valve 106. In still other embodiments, the controller 300 may receive sensed pressure data from at least one pressure sensor 130. In some embodiments, the sensed pressure data is indicative of a pressure of at least a portion of the system. For example, in some embodiments, the at least one sensor is a pressure sensor 130 located proximate the valve 106 fluidly coupled to the heat pipe 102 and the sensed pressure data is indicative of a pressure near the valve 106. In other embodiments, the at least one sensor (e.g., temperature sensor, pressure sensor, or the like) may be located proximate an auxiliary device of the nuclear reactor, such as a heat pipe-cooled auxiliary pump.

In some embodiments, the controller 300 may continuously monitor the relative temperature and/or pressure of the portion of the nuclear reactor (e.g., interior of the heat pipe reactor core 100, 200, interior of a heat-pipe cooled auxiliary pump, etc.). By way of example, the at least one sensor may determine the relative temperature of the interior of the heat pipe reactor core 100, 200 and transmit this data to the controller 300. By way of further non-limiting example, the controller 300, in operation, may receive such data from the at least one sensor corresponding to the relative temperature of the interior of the heat pipe reactor core 100, 200. In some embodiments, the at least one sensor may determine that the relative temperature within the interior of the heat pipe reactor core 100, 200 is a first detected temperature for a period of time during operation and the controller 300 may receive the sensed temperature data from the at least one sensor indicating the first detected temperature. Additionally or alternatively, in some embodiments, the at least one sensor may determine that the relative pressure within a portion of the system is a first detected pressure for a period of time during operation and the controller 300 may receive the sensed pressure data from the at least one sensor indicating the first detected pressure.

As shown in operation 410, the controller 300 determines whether the sensed temperature satisfies a first predefined threshold. For example, the controller 300 may include means, such as memory 301, processor 302, or the like, for determining whether the sensed temperature satisfies a first predefined threshold. In some embodiments, the controller 300 compares the received sensed temperature data to one or more predefined thresholds in order to determine if the temperature satisfies (e.g., exceeds) one or more such predefined thresholds (e.g., predefined temperature threshold (s)). By way of example, the controller 300 may retrieve one or more predefined threshold from memory 301 and/or any other repository.

In certain embodiments, controller 300 may determine that the first detected temperature of the sensed temperature data does not satisfy (e.g., exceed) any of the predefined thresholds. In such embodiments, the controller 300 may not activate the valve(s) during normal operation (e.g., no fire detected) of a heat pipe-cooled reactor or heat pipe-cooled auxiliary device such that the valve(s) 106 remain closed, preventing the fire suppressant material from entering the heat pipe and/or enclosed gas chamber.

In some embodiments, controller 300 may determine that the first detected temperature (e.g., of the sensed temperature data) within the interior of the heat pipe reactor core 200 satisfies (e.g., exceeds) the first predefined threshold (e.g., associated with a small increase in temperature due to, for example, a small alkali metal fire). In some embodiments, the first predefined threshold is associated with a first valve in fluid communication with the first end of at least one heat pipe and a first suppressant chamber.

In some embodiments, the controller 300 may optionally determine that the sensed temperature data satisfies (e.g., exceeds) the first predefined temperature threshold but no other predefined temperature threshold(s) (e.g., second predefined threshold associated with a second valve, third predefined threshold associated with a third valve, etc.). In still further embodiments, the first predefined threshold is optionally associated with additional valve(s), such that additional valve(s) are also activated in operation 415 described below. In a non-limiting example, in an instance in which the temperature satisfies (e.g., exceeds) the first predefined threshold, the controller 300 may also activate the second valve such that a flow of fire suppressant material is forcibly injected into the interior cavity via both ends of the heat pipe as described hereinabove and/or at least a portion of the working fluid in the interior cavity of the heat pipe is evacuated from the heat pipe as described hereinabove.

Additionally or alternatively, in an embodiment wherein the heat pipe-cooled reactor comprises dual-ended heat pipes and a second valve is in fluid communication with the second end of at least one heat pipe and a second suppressant chamber, controller 300 may optionally determine that the first detected temperature of the sensed temperature data satisfies (e.g., exceeds) a second predefined threshold associated with the second valve which is configured to regulate a flow of fire suppressant material from the second suppressant chamber into the second end of at least one heat pipe.

Additionally or alternatively, in an embodiment wherein the heat pipe-cooled reactor comprises dual-ended heat pipes and a second valve is in fluid communication with the second end of at least one heat pipe, controller 300 may optionally determine that the first detected temperature of the sensed temperature data satisfies (e.g., exceeds) a second predefined threshold associated with the second valve which is configured to evacuate at least a portion of a working fluid from the heat pipe through the second valve.

Additionally or alternatively, in an embodiment wherein a heat pipe in the heat pipe-cooled reactor is associated with an enclosed gas chamber in fluid communication with a third suppressant chamber via a third valve, controller 300 may optionally determine that the first detected temperature of the sensed temperature data satisfies (e.g., exceeds) a third predefined threshold associated with the third valve which is configured to regulate a flow of fire suppressant material from the third suppressant chamber into the enclosed gas chamber.

Additionally or alternatively, in an embodiment wherein a heat pipe in the heat pipe-cooled reactor is associated with an enclosed gas chamber in fluid communication with a fourth suppressant chamber via a fourth valve, controller 300 may optionally determine that the first detected temperature of the sensed temperature data satisfies (e.g., exceeds) a fourth predefined threshold associated with the fourth valve which is configured to regulate a flow of fire suppressant material from the fourth suppressant chamber into the enclosed gas chamber.

Although described herein with reference to sensed temperature data and temperatures thresholds, the present disclosure contemplates that, in some embodiments, the controller may instead or also be used to determine whether a sensed pressure satisfies any number of pressure threshold(s) without deviating from the scope of the invention and is not limited to temperature data.

As shown in operation 415, the controller 300 activates the valve in response to determining that the sensed temperature data satisfies the first predefined threshold. For example, the controller 300 may include means, such as processor 302, input/output circuitry 303, communications circuitry 304, or the like, for activating the valve such that a flow of fire suppressant material is injected into an interior cavity of the at least one heat pipe. That is, the controller 300 may activate the valve such that the flow of fire suppressant material is injected into the interior cavity of the at least one heat pipe via, for example, the first end of the heat pipe. Said differently, in an instance in which the temperature satisfies (e.g., exceeds) the first predefined threshold, the controller 300 activates the valve (e.g., first valve) such that a flow of fire suppressant material is forcibly injected into the interior cavity of the heat pipe as described hereinabove.

Additionally or alternatively, in an embodiment wherein the heat pipe-cooled reactor comprises dual-ended heat pipes and the controller 300 determined that the first detected temperature of the sensed temperature data satisfied (e.g., exceeded) the second predefined threshold associated with the second valve, the controller 300 may optionally activate the second valve in addition to the first valve such that flows of fire suppressant material are injected into the interior cavity via the first and second ends of the at least one heat pipe. Said differently, in an instance in which the temperature satisfies (e.g., exceeds) the first and second predefined thresholds, the controller 300 activates the first and second valves such that flows of fire suppressant material are forcibly injected into the interior cavity of the heat pipe from both ends as described hereinabove.

Additionally or alternatively, in an embodiment wherein the heat pipe-cooled reactor comprises dual-ended heat pipes and the controller 300 determined that the first detected temperature of the sensed temperature data satisfied (e.g., exceeded) the second predefined threshold associated with the second valve, the controller 300 may optionally activate the second valve, in addition to the first valve, in order to evacuate at least a portion of a working fluid from the heat pipe through the second valve. In certain embodiments, such evacuation of the working fluid through the second end of the heat pipe is configured to occur prior to the injection of the fire suppressant material into the first end of the heat pipe to encourage sufficient dispersion of the fire suppressant material throughout the heat pipe. In still other embodiments, such evacuation of the working fluid through the second end of the heat pipe is configured to occur simultaneously with the injection of the fire suppressant material into the first end of the heat pipe.

Additionally or alternatively, in an embodiment wherein a heat pipe in the heat pipe-cooled reactor is associated with an enclosed gas chamber and the controller 300 determined at operation 410 that the first detected temperature of the sensed temperature data satisfied (e.g., exceeded) the third predefined threshold associated with the third valve, the controller 300 may optionally activate the third valve in addition to the first valve (e.g., and/or second valve) such that a flow of fire suppressant material is also injected into the enclosed gas chamber.

Although not illustrated, additionally or alternatively, in some embodiments, the controller 300 is optionally configured to cause dispersion of a neutron absorber material throughout the heat pipe reactor core in response to determining that the sensed temperature data satisfies a predefined threshold (e.g., the first predefined threshold) such that a fire or fire-like conditions is detected. For example, the controller 300 may include means, such as processor 302, input/output circuitry 303, communications circuitry 304, or the like, for releasing neutron absorber material. For example, in some embodiments, a neutron absorber material is disposed in the plurality of gaps 203 such that when a fire or fire-like conditions is detected, the neutron absorber material is released throughout and surrounding the plurality of fuel rods 201 in order to reduce core reactivity and prevent further damage.

FIG. 4 thus illustrates a flowchart describing the operation of apparatuses (e.g., controller in association with a nuclear reactor), methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 301 of the controller 300 and executed by a processor 302 of the controller 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the terms "illustrative," "example," "exemplary" and the like are used to mean "serving as an example, instance, or illustration" with no indication of quality level. Any implementation described herein as "exemplary" or "example" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks (e.g., a floppy disk, hard disk, magnetic tape, any other magnetic medium), one or more optical disks (e.g., a compact disc read only memory (CD-ROM), a digital versatile disc (DVD), a Blu-Ray disc, or the like), one or more USB flash drives, a computer system memory or a random access memory (such as, RAM, DRAM, SRAM, EDO RAM), a programmable read only memory (PROM), an erasable programmable read only memory (EPROM), a FLASH-EPROM, or any other non-transitory medium from which a computer can read. It will be appreciated that where embodiments are described to use a computer-readable storage medium, other types of computer-readable mediums can be substituted for or used in addition to the computer-readable storage medium in alternative embodiments.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system comprising:

a nuclear reactor comprising a heat pipe reactor core;

a plurality of heat pipes, wherein each respective heat pipe comprises an elongated body defining a first end of the respective heat pipe and a second end opposite the first end and an interior cavity therebetween, and wherein the first end and the second end of each respective heat pipe are positioned externally of the heat pipe reactor core such that the heat pipe reactor core engages the plurality of heat pipes between the first end and the second end of the respective heat pipe;

a heat exchanger device, the heat exchanger device defining an enclosed gas chamber annularly surrounding at least a portion of at least one heat pipe, the enclosed gas chamber comprising an inert gas; and a first suppressant chamber and a second suppressant chamber, each suppressant chamber containing a fire suppressant material, wherein a first valve is positioned proximate the first end of at least one heat pipe of the plurality of heat pipes, the first valve fluidly coupling the at least one heat pipe to the first suppressant chamber, wherein the first valve is movable between open and closed positions to regulate a flow of the fire suppressant material from the first suppressant chamber into the interior cavity of the at least one heat pipe, wherein a second valve is positioned proximate the first end of the at least one heat pipe of the plurality of heat pipes, the second valve fluidly coupling the enclosed gas chamber to the second suppressant chamber, and wherein the second valve is movable between open and closed positions to regulate the flow of the fire suppressant material from the second suppressant chamber into the enclosed gas chamber.

2. The system of claim 1, wherein the fire suppressant material comprises boron.

3. The system of claim 1, wherein the nuclear reactor is a molten-salt cooled reactor and further comprises an auxiliary pump configured to pump molten salt through a molten-salt cooled reactor core and the at least one heat pipe is configured to assist in regulating a temperature of the auxiliary pump.

4. The system of claim 1, the system further comprising:

at least one sensor; and a controller communicably coupled with the at least one sensor, the controller configured to:

receive sensed temperature data from the at least one sensor, the sensed temperature data indicative of a temperature of at least a portion of the system;

determine whether the sensed temperature data satisfies a first predefined threshold; and in response to determining that the sensed temperature data satisfies the first predefined threshold, activate the first valve such that the first valve is in the open position and the flow of the fire suppressant material from the first suppressant chamber is injected into the interior cavity of the at least one heat pipe.

5. The system of claim 4, wherein the at least one sensor is located proximate an exit of the heat pipe reactor core.

6. The system of claim 4, wherein the system further comprises: a third suppressant chamber, wherein a third valve is positioned proximate the second end of at least one heat pipe of the plurality of heat pipes, the third valve fluidly coupling the at least one heat pipe of the plurality of heat pipes to the third suppressant chamber, and wherein the third valve is movable between open and closed positions to regulate a flow of fire suppressant material from the third suppressant chamber into the interior cavity of the at least one heat pipe or regulate a flow of working fluid from the interior cavity into the third suppressant chamber.

7. The system of claim 6, wherein the third suppressant chamber contains the fire suppressant material, and wherein the controller is further configured to:

determine whether the sensed temperature data satisfies a second predefined threshold; and in response to determining that the sensed temperature data satisfies the second predefined threshold, activate the first valve and the third valve such that each of the first and third valves is in the open position and the flows of the fire suppressant material are simultaneously injected into the interior cavity of the at least one heat pipe via the first and second ends of the at least one heat pipe.

8. The system of claim 6, wherein the controller is further configured to:

determine whether the sensed temperature data satisfies a second predefined threshold; and in response to determining that the sensed temperature data satisfies the second predefined threshold, activate the third valve such that the third valve is in the open position to evacuate at least a portion of a working fluid from the interior cavity of the at least one heat pipe through the third valve.

9. The system of claim 8, wherein the evacuation of the at least a portion of the working fluid through the third valve is configured to occur simultaneously with the injection of the fire suppressant material from the first suppressant chamber into the interior cavity of the at least one heat pipe via the first valve.

10. The system of claim 8, wherein the controller is configured to activate the third valve such that the third valve is in the open position to evacuate the at least a portion of the working fluid through the third valve prior to activating the first valve to inject the fire suppressant material from the first suppressant chamber into the interior cavity of the at least one heat pipe via the first valve.

11. The system of claim 10, wherein the controller is further configured to:

subsequent to activating the first valve, activate the second valve such that the second valve is in the open position and the flow of the fire suppressant material from the second suppressant chamber is injected into the enclosed gas chamber.

12. The system of claim 6, wherein the system further comprises:

a fourth suppressant chamber, wherein a fourth valve is positioned proximate the second end of the at least one heat pipe of the plurality of heat pipes, the fourth valve fluidly coupling the enclosed gas chamber to the fourth suppressant chamber, and wherein the fourth valve is movable between open and closed positions to regulate a flow path from the fourth suppressant chamber into the enclosed gas chamber.

13. The system of claim 1, wherein the heat exchanger device comprises a layer of phase change material disposed on an outer surface of the enclosed gas chamber.

14. The system of claim 13, wherein the phase change material is a salt.

15. The system of claim 13, wherein the phase change material is an alkali metal fire retardant.

16. The system of claim 13, wherein the layer of phase change material is partitioned by one or more partition components, the one or more partition components extending from the outer surface of the enclosed gas chamber, through the layer of phase change material, to an outer surface of the layer of phase change material.

17. The system of claim 16, wherein the heat exchanger device comprises at least one heat dissipating surface disposed on the outer surface of the layer of phase change material, the at least one heat dissipating surface comprising one or more fin components.

18. The system of claim 1, wherein the heat pipe reactor core further comprises a plurality of gaps between a plurality of fuel rods and the plurality of heat pipes, and wherein a neutron absorber material is disposed in the plurality of gaps.

19. The system of claim 18, wherein the neutron absorber material comprises cadmium.

20. The system of claim 1, wherein the fire suppressant material in the second suppressant chamber differs from the fire suppressant material in the first suppressant chamber.

* * * * *